US008694886B2

(12) United States Patent
Acedo et al.

(10) Patent No.: US 8,694,886 B2
(45) Date of Patent: *Apr. 8, 2014

(54) PROVIDING DYNAMIC CONTEXT ASSIST FOR A COMMAND LINE INTERFACE

(75) Inventors: Mario F. Acedo, Tucson, AZ (US);
Ezequiel Cervantes, Tucson, AZ (US);
Paul A. Jennas, II, Tucson, AZ (US);
Jason L. Peipelman, Vail, AZ (US);
Matthew J. Ward, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 1138 days.

This patent is subject to a terminal disclaimer.

(21) Appl. No.: 11/968,554

(22) Filed: Jan. 2, 2008

(65) Prior Publication Data

US 2009/0172541 A1    Jul. 2, 2009

(51) Int. Cl.
*G06F 3/00* (2006.01)
*G06F 3/048* (2013.01)
*G06F 9/44* (2006.01)

(52) U.S. Cl.
CPC .............. *G06F 3/048* (2013.01); *G06F 9/4446* (2013.01)
USPC .......................................... 715/708; 345/338

(58) Field of Classification Search
CPC ................................ G06F 9/4446; G06F 3/048
USPC .......................................... 715/708; 345/338
See application file for complete search history.

(56) References Cited

U.S. PATENT DOCUMENTS

| 5,187,480 | A | * | 2/1993 | Thomas et al. ................... 341/22 |
| 5,600,579 | A | * | 2/1997 | Steinmetz, Jr. ................... 703/13 |
| 6,539,427 | B1 | * | 3/2003 | Natarajan et al. ............ 709/224 |
| 6,625,590 | B1 | * | 9/2003 | Chen et al. .................... 709/223 |
| 6,724,408 | B1 | * | 4/2004 | Chen et al. .................... 715/853 |
| 7,065,562 | B2 | | 6/2006 | Courtney |
| 7,069,512 | B2 | * | 6/2006 | Harvey et al. ................. 715/736 |
| 7,290,263 | B1 | * | 10/2007 | Yip et al. ...................... 719/313 |
| 7,328,325 | B1 | * | 2/2008 | Solis et al. .................... 711/202 |
| 7,386,586 | B1 | * | 6/2008 | Headley et al. ............... 709/202 |
| 7,454,701 | B2 | * | 11/2008 | Graeber ........................ 715/267 |
| 7,487,466 | B2 | * | 2/2009 | Peters ........................... 715/808 |
| 7,509,400 | B1 | * | 3/2009 | Tanner et al. ................ 709/220 |
| 2002/0077801 | A1 | | 6/2002 | Morehead et al. |
| 2003/0163448 | A1 | | 8/2003 | Kilemba et al. |
| 2004/0158621 | A1 | | 8/2004 | Reyna |

(Continued)

OTHER PUBLICATIONS

Wavrik, John J. "An Extensible User Interface", Forth Dimensions XIX.6; pp. 19-27; Mar.-Apr. 1998.

(Continued)

*Primary Examiner* — Ece Hur
(74) *Attorney, Agent, or Firm* — Yudell Isidore Ng Russell PLLC

(57) ABSTRACT

A method, system, and computer program product for providing dynamic context assistance to a user of a system, such as a storage system. One or more current command line interface (CLI) entries that are entered in a CLI of the system are received and a current state of the system is determined. Dynamic context assistance is then generated for one or more current CLI entries based on entered values of the one or more CLI entries. In this regard, the dynamic context assistance can be generated and displayed in a text or graphical form when one or more dynamic context assist keys are entered in the CLI in conjunction with the current CLI entry.

17 Claims, 4 Drawing Sheets

(56) References Cited

U.S. PATENT DOCUMENTS

| | | | | |
|---|---|---|---|---|
| 2004/0249849 | A1* | 12/2004 | Mordkovich | 707/102 |
| 2004/0254928 | A1* | 12/2004 | Vronay et al. | 707/5 |
| 2005/0243066 | A1* | 11/2005 | Li et al. | 345/168 |
| 2007/0135949 | A1 | 6/2007 | Snover et al. | |
| 2007/0157115 | A1* | 7/2007 | Peters | 715/808 |
| 2009/0055733 | A1* | 2/2009 | Graeber | 715/271 |
| 2009/0055738 | A1* | 2/2009 | Acedo et al. | 715/708 |
| 2010/0241842 | A1* | 9/2010 | Acedo et al. | 713/100 |

OTHER PUBLICATIONS

Westendorp, Piet "Guided Systems Versus Interactive Online Help"; Crossroads in Communication pp. 1-8; 1997.

Acedo et al.; "Techniques for Providing Dynamic Help Content for a Command Line Interface"; U.S. Appl. No. 11/844,113, filed Aug. 23, 2007.

\* cited by examiner

PROVIDING DYNAMIC CONTEXT ASSIST FOR A COMMAND LINE INTERFACE

BACKGROUND OF THE INVENTION

1. Technical Field

This disclosure relates generally to data processing systems, and more specifically to techniques for providing dynamic context assist for a command line interface.

2. Description of the Related Art

A command line interface (CLI) provides a method of interacting with an operating system or other software using a command line interpreter, which may be a text terminal, a terminal emulator, or remote shell client. A CLI is typically used when a large vocabulary of commands or queries, coupled with a wide range of options, can be entered more rapidly as text than with a pure graphical user interface (GUI). CLIs are often used by programmers and system administrators (e.g., in engineering and scientific environments) and by technically advanced personal computer users. A CLI can generally be considered as consisting of syntax and semantics. The syntax is the grammar that all commands must follow. In the case of operating systems (OSes), each OS defines its own set of rules that all commands must follow. In the case of embedded systems, each vendor defines their own proprietary set of rules to which all commands within their CLI conform. In general, the rules also dictate how a user navigates through the system of commands and the semantics define what sort of operations are possible, and on what sort of data these operations can be performed. A relatively simple CLI usually displays a prompt to accept a command line that is typed by a user and terminated by an enter key.

Upon executing an entered command, a relatively simple CLI usually provides a textual display of a result (or an error message). Advanced CLIs usually validate, interpret and parameter-expand the command line before executing the specified command, and optionally capture or redirect the command's output. Unlike a button or menu item in a GUI, a command line is typically self-documenting, stating exactly what the user wants done. In addition, command lines usually include many defaults that can be changed to customize the results. Useful command lines can usually be stored by assigning a character string or alias to represent the full command, or several commands can usually be grouped to perform a more complex sequence, which creates a single entity called a command procedure or script which itself can be treated as a command.

In some CLIs, the commands issued are not coupled to any conceptual place within a command hierarchy. In this case, a user can specify relative or absolute paths to any command or data. Following this approach, resource protection is typically achieved by assigning resource ownership to privileged groups, and password-protecting user accounts which may be members of specific groups. Other CLIs (such as those employed in conjunction with routers) may limit the set of commands that a user can perform to a subset of commands which is determined by a location within a command hierarchy, e.g., grouped by association with security, a system, an interface, etc. The location within this hierarchy and the options available are often referred to as a mode. In such systems, a user might traverse through a series of sub-hierarchies, each with their own subset of commands. For example, if the CLI includes an interface mode and a system mode, a user may enter the word "interface" at a command prompt (i.e., a sequence of one or more characters used in a CLI to indicate readiness to accept commands) to enter the interface mode, where a predetermined subset of commands and data are available. In this case, system commands are not accessible until the user explicitly exits the interface mode.

CLIs for many products have become relatively complex. For example, the commands executed for CLIs associated with storage products have become increasingly complex in order to manage a relatively large number of object resources and resource states. Generally, existing methods for determining the necessary parameter values for a selected command requires multiple manual queries by a user. Such existing methods require a significant amount of typing on the part of the user. Moreover, existing methods require a user to manually record (e.g., write down or type) previously executed command results when such results scroll off of a display when a relatively large amount of data has been returned. In the case of users requiring assistive technologies (i.e., visually impaired and/or otherwise physically handicapped users), performing such manual actions become an even greater challenge.

SUMMARY OF THE ILLUSTRATIVE EMBODIMENTS

Disclosed is a method, system, and computer program product for providing dynamic context assistance to a user of a system. According to one embodiment, the system is a computer storage system, although the system can include any type of data processing system that employs the use of a command line interface (CLI). The method includes receiving one or more current CLI entries and one or more predefined execution key entries that are entered in a CLI of the system. A current state of the system based on the entered and executed values of the one or more CLI entries is determined. Dynamic context assistance is then generated for one or more current CLI entries based on the current state of the system. The dynamic context assistance is generated and displayed in a text or graphical form when one or more predefined execution keys are entered in the CLI and executed in conjunction with the current CLI entry.

The above as well as additional objectives, features, and advantages of the present invention will become apparent in the following detailed written description.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale, wherein.

DETAILED DESCRIPTION OF THE ILLUSTRATIVE EMBODIMENTS

Figure 1:
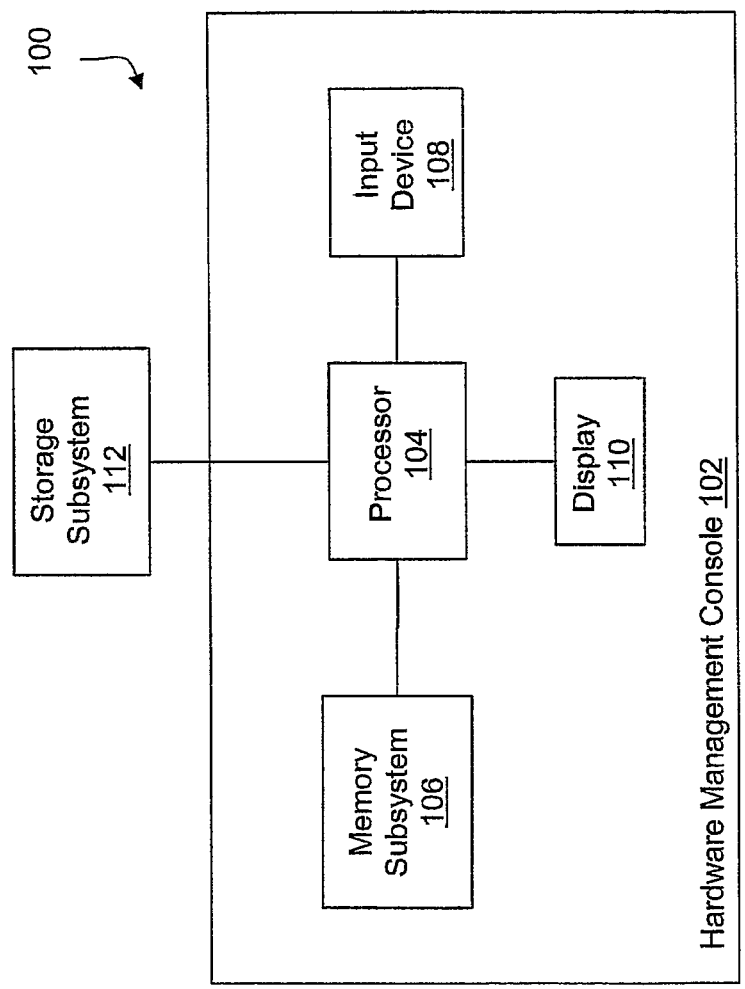
FIG. 1 is a block diagram of an exemplary storage system that employs a command line interface (CLI) that may be configured to provide assistance to a user of the system, according to various embodiments of the present disclosure.

As will be appreciated by one of ordinary skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but is not limited to, an electronic, magnetic, optical, electromagnetic, infrared, or semiconductor system, apparatus, device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain or store the program for use by or in connection with an instruction execution system, apparatus, or device.

Computer program code for carrying out operations of the present invention may be written in an object oriented programming language, such as Java® (JAVA is a trademark or registered trademark of Sun Microsystems, Inc. in the United States and other countries), Cincom Smalltalk® (CINCOM SMALLTALK is a trademark or registered trademark of Cincom Systems, Inc. in the United States or other countries), C++ or the like. However, the computer program code for carrying out operations of the present invention may also be written in conventional procedural programming languages, such as the "C" programming language or similar programming languages. The program code may execute entirely on a single computer, on multiple computers that may be remote from each other, or as a stand-alone software package. When multiple computers are employed, one computer may be connected to another computer through a local area network (LAN) or a wide area network (WAN), or the connection may be, for example, through the Internet using an Internet service provider (ISP).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. As used herein, the term "coupled" includes both a direct electrical connection between blocks or components and an indirect electrical connection between blocks or components achieved using intervening blocks or components.

According to one aspect of the present disclosure, a technique for providing dynamic context assistance to a user of a system includes (a) receiving at least one of a current, and completed or partially completed CLI entry (i.e., (i) command name, (ii) command flag, (iii) flag parameter value, (iv) command parameter value, and/or (v) command sub-parameter value) entered in a command line interface (CLI) of the system, and (b) determining a current state (i.e., configuration based on the entered and executed values of the one or more CLI entries) of the system. As used herein, a system refers to any data processing system that employs the use of a CLI. Examples of such systems include, but are not limited to computer systems, data storage systems, and networking systems.

In a typical case, the user indicates (to the system) that the user desires dynamic context assistance by entering and executing a defined key or key sequence (e.g., <tab>, ctrl+space, etc.) in conjunction with the current command. Alternatively, dynamic context assistance may be indicated in other manners (e.g., by placing the CLI in a dynamic context assist mode). Dynamic context assistance (in graphical or text form) for the current executed command is then generated based on the current state of the system. When the dynamic context assistance is provided in graphical form, the user of the system may select from one or more suggested CLI entry strings (included within the dynamic context assist (DCA) utility) for execution by, for example, double clicking on the suggested CLI entry string using a mouse.

According to another aspect of the present disclosure, a system is disclosed that includes a display and a processor that is coupled to the display. The processor is configured to: (a) receive a current, and completed or partially completed CLI entry that is entered in a command line interface (CLI) of the system, and (b) determine a current state (i.e., configuration based on the entered and executed values of the one or more CLI entries) of the system. Context assistance (in graphical or text form) for the current CLI entry is then generated based on the current state of the system.

With reference to FIG. 1, exemplary storage system 100 (e.g., IBM® System Storage™ DS6000 or DS8000 series storage servers manufactured and made commercially available by IBM Corp.) is illustrated. Storage system 100 may be configured to include a dynamic context assist (DCA) utility (e.g., stored in memory subsystem 106) that is configured to provide dynamic context assistance to a user according to the present disclosure. As is shown, storage system 100 includes hardware management console (HMC) 102 that is coupled to storage subsystem (product) 112. The dynamic context assist utility may be locally stored in a computer storage medium on HMC (i.e., computer system) 102 or stored within a computer storage medium on a different computer system (e.g., a computer system that is included as part of storage subsystem 112). The dynamic context assist utility may, for example, execute within a same Java virtual machine (JVM) as a command line interface (CLI) utility or execute within a different JVM. Storage subsystem 112 may include, for example, multiple servers, multiple redundant arrays of inexpensive disks (RAID) subsystems, etc.

As is illustrated, HMC 102 includes processor 104 (including one or more central processing units (CPUs)) that is coupled to memory subsystem 106 (which includes an application appropriate amount of volatile and non-volatile memory), input device 108 (e.g., a keyboard and a mouse), and display 110 (e.g., a cathode ray tube (CRT) or a liquid crystal display (LCD)). HMC 102 may be utilized, for example, by an administrator who is attempting to setup, maintain, or troubleshoot operation of storage subsystem 112. Processor 104 of HMC 102 is in communication with storage subsystem 112 and receives input from a user via a command line interface (CLI) provided via display 110. Alternatively, HMC 102 may be incorporated within storage subsystem 112 or within another system or subsystem. While the techniques disclosed herein are discussed in conjunction with a storage system, it is contemplated that the techniques are broadly applicable to the configuration of hardware (e.g., network hardware) using a CLI. The techniques disclosed herein generally increase the usability of a system by freeing a user from having to execute manual queries. Moreover, the disclosed techniques ensures the generation of a valid CLI entry, even if the user has limited knowledge of the business logic. In this regard, a user of the system is educated as to proper command syntax and semantics.

Figure 2:
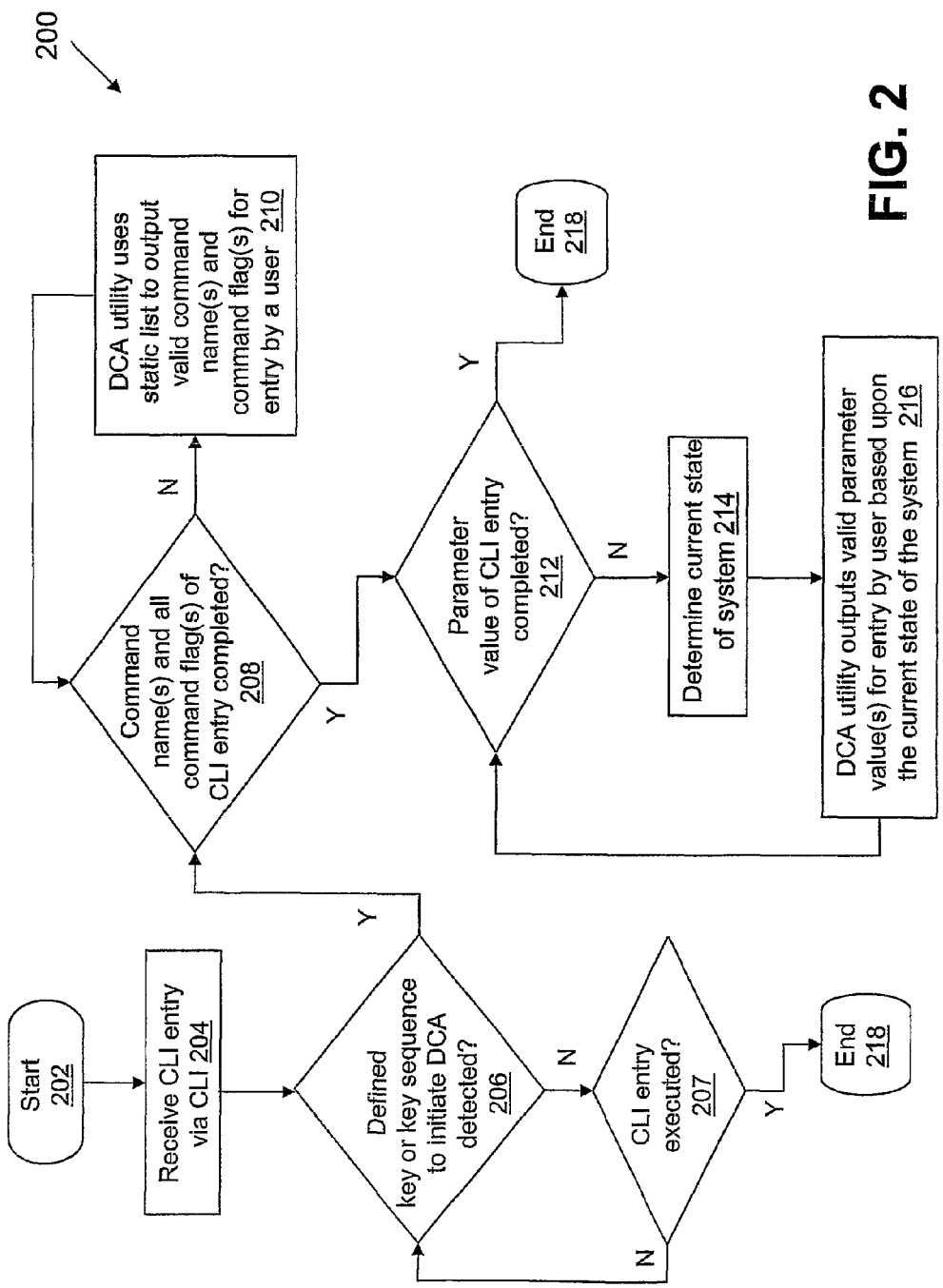
FIG. 2 is a flowchart of an exemplary process for providing dynamic context assistance to a user of the system of FIG. 1, according to one embodiment of the present disclosure.

Referring now to FIG. 2, an exemplary process 200 for providing dynamic context assistance to a user of a system, e.g., storage system 100, is illustrated. In block 202, process 200 is initiated at which point control transfers to block 204. In block 204, a command line interpreter receives a CLI entry. In addition to receiving a CLI entry, the command line interpreter also receives a request (via the entry and execution of a predefined execution key or key sequence) to initiate a dynamic context assist (DCA) utility via CLI. Then, at decision block 206, it is determined whether a predefined execution key or key sequence to initiate DCA utility is detected. If a predefined execution key or key sequence is not detected, the process 200 continues to decision block 207, in which a determination is made whether the CLI entry has been executed. If the CLI entry has been executed, process 200 ends at termination block 218. However, if the CLI entry has not been executed, process 200 returns to decision block 206. Once the predefined execution key or key sequence to initiate the DCA utility is detected, control transfers to decision block 208.

In decision block 208, it is determined whether the CLI entry includes a completed command name(s), as well as all command flag(s). As used herein, the term 'completed' refers to a valid state of a CLI entry, in terms of its syntax and semantics. If the command name(s) and all command flag(s) of CLI entry are not completed, the process transfers to block 210. At block 210, the DCA utility uses a static list to output valid command name(s) and command flag(s) for entry by a user. The process 200 then returns to decision block 208, in which it is again determined whether the command name(s) and all command flag(s) of CLI entry is completed (i.e., user has selected and entered a valid command name(s) and all command flag(s)).

Once it is determined that the entry of the command name(s) and all command flag(s) is completed, the process 200 continues to decision block 212 where it is determined whether a parameter value of the CLI entry is completed. If the parameter value of the CLI entry is not completed (or partially completed), a current state (configuration) of the system is determined, as depicted in block 214. The current state of the system is based on the entered and executed values of the one or more CLI entries. From block 214, process 200 continues to decision block 220 where a determination is made whether valid parameter value(s) are available for output. If valid parameter value(s) are not available, a warning notification is communicated to user in block 222 and the process then terminates at block 218.

However, if valid parameter value(s) are available, the process moves to block 216, where the DCA utility outputs valid parameter value(s) for entry by the user. In this regard, the valid parameter value is based upon the current state of the system, and is generated and displayed, via, for example, a pop-up GUI display window. The user may then enter the parameter value in an appropriate manner in the CLI. Alternatively, the user may select a valid parameter value from the pop-up GUI display window for execution. The process 200 then returns to decision block 212, in which it is again determined whether the parameter value of the CLI entry is now complete (i.e., user has selected and entered a valid parameter value). After it is determined that the parameter value of the CLI entry is complete, the process 200 ends at termination block 218.

Figure 3A:
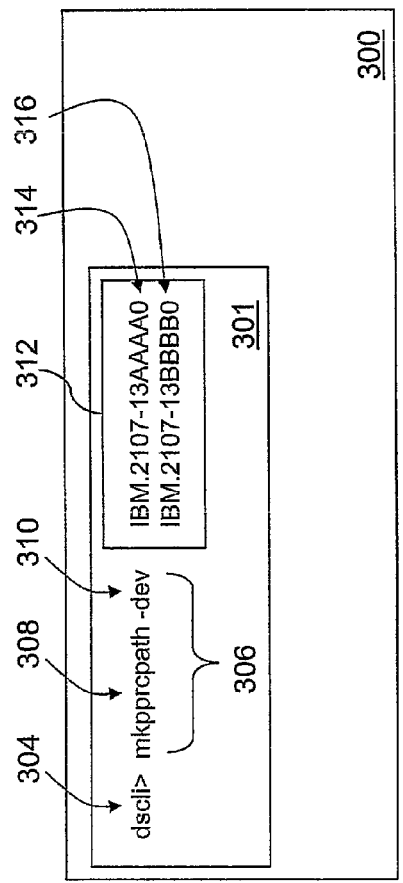
FIGS. 3A-3D illustrate examples of screen dumps that provide dynamic context assistance.

Turning to FIG. 3A, an example display 300 is depicted that illustrates various aspects of the present disclosure. The display 300 includes CLI 301 that depicts prompt 304 (i.e., dscli>) and entered command string 306 that includes command name 308 (i.e., 'mkpprcpath') and first command flag 310 (i.e., '-dev'). After command string 306 is entered, the user enters a predefined execution key or key sequence (e.g., '<tab> key') to initiate the DCA utility. Since the user has entered first command flag 310 (i.e., '-dev'), a parameter value (i.e., a storage facility image identification (ID)) is required to be passed to first command flag 310. Upon entering the defined key (i.e., '<tab> key'), DCA completion box 312 is displayed to the user. DCA completion box 312 displays available and valid parameter values that can be passed to first command flag 310. According to the example shown in FIG. 3A, two possible valid parameter values are displayed (i.e., IBM.2107-13AAA0 parameter value 314 and IBM.2107-13BBBB0 parameter value 316). The user can then select from one of parameter values 314, 316. This method ensures that a valid parameter value is entered in CLI 301.

Figure 3B:
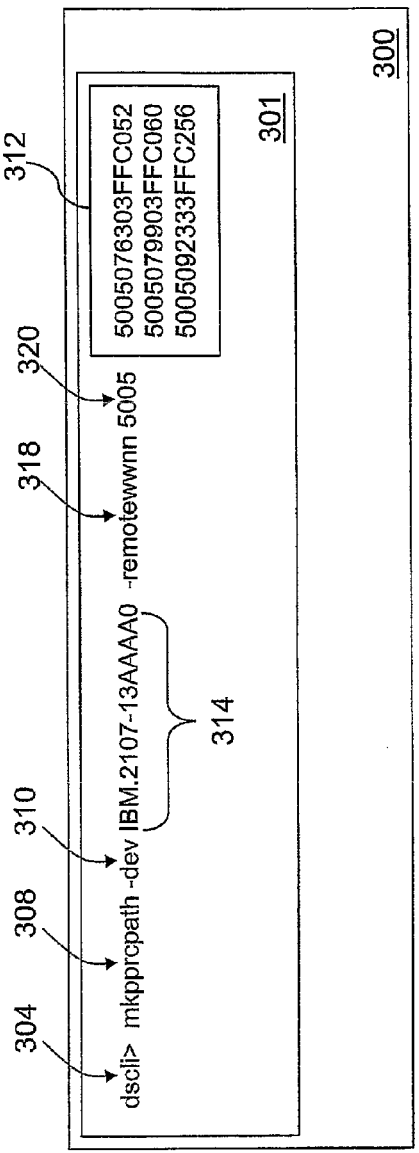

With reference now to FIG. 3B, example display 300 illustrates another embodiment employing the use of the DCA utility. Moreover, FIG. 3B is a continuation of the example shown in FIG. 3A. In this regard, FIG. 3B shows CLI 301 after the user has already selected parameter value 314 from DCA completion box 312. The user then continues to specify second command flag 318 (i.e., -remotewwnn) and partially completed parameter value 320 (i.e., 5005). Since the user has entered second command flag 318 (i.e., '-remotewwnn'), a valid parameter value (i.e., valid 16-hexadecimal bit World Wide Node Name (WWNN)) is required to be passed to command flag 318. However, in the example shown in FIG. 3B, the user has partially completed a by only specifying the first four hexadecimal bits of the WWNN (i.e., 5005; partially completed parameter value 320). Upon entering the predefined execution key (i.e., '<tab> key'), DCA completion box 312 is displayed again to the user. DCA completion 312 displays available and valid parameter values that can be passed to command flag 318. Since the user has partially specified a parameter value, DCA utility is required to output only those valid parameter values that start with the specified hexadecimal bits '5005'. As a result, three valid parameter values are displayed in DCA completed box 312 (i.e., 5005076303FFC052, 5005079903FFC060, and 5005092333FFC256) for a user to select.

Figure 3C:
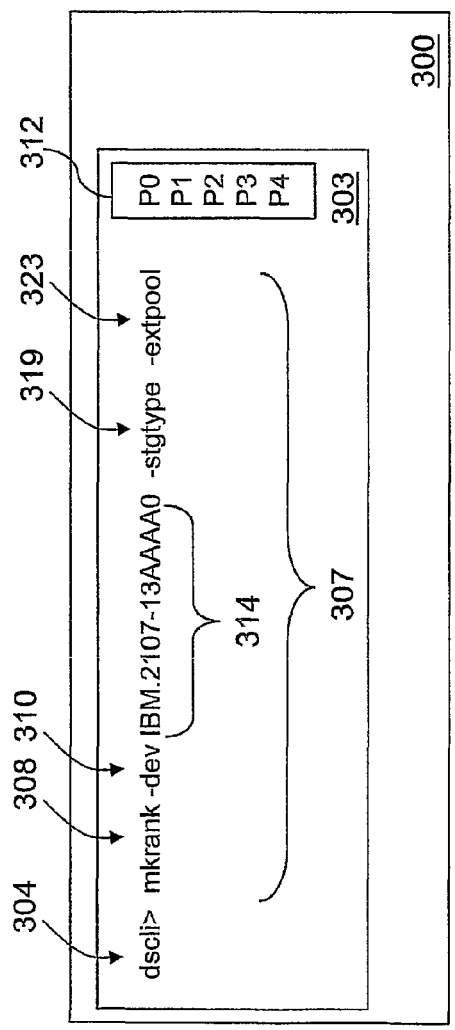

Referring now to FIG. 3C, exemplary display 300 illustrates another embodiment employing the use of the DCA utility. Display 300 includes CLI 303 that depicts prompt 304 (i.e., dscli>) and entered command string 307 that includes command name 308 (i.e., 'mkrank'), first command flag 310 (i.e., '-dev'), selected parameter value 314, second command flag 319 (i.e., '-stgtype'), and third command flag 323 (i.e., -extpool). After command string 307 is entered, the user enters the predefined execution key (e.g., '<tab> key') or key sequence to initiate the DCA utility. Since the user has entered third command flag 323 (i.e., '-extpool'), a parameter value (i.e., an extent pool ID) is required to be passed to third command flag 323. Upon entering the defined key (i.e., '<tab> key'), DCA completion box 312 is displayed to the user. DCA completion box 312 displays available and valid parameter values that can be passed to third command flag 323. According to the example shown in FIG. 3C, since the second command flag 319 (i.e., stgtype) has not specified a flag parameter value (i.e., Fixed Block (FB) storage type or Count-Key-Data (CKD) storage type), there are five possible valid parameter values (i.e., ranks P0-P4) that can be passed to third command flag 323. Each rank P0-P4 is associated with either a FB storage type or a CKD storage type.

Figure 3D:
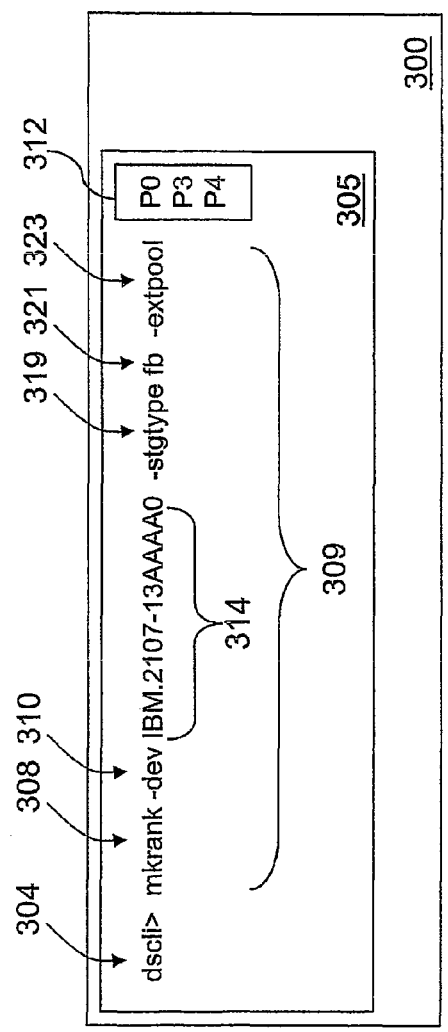

Referring now to FIG. 3D, exemplary display 300 is shown with CLI 305 that includes a similarly entered command string 309 as compared to the entered command string 307 of FIG. 3C, with the exception that the user has specified a flag parameter value (i.e., PB storage type) for second command flag 319 (i.e., -stgtype). Since the user has specified an FB storage type, the user can only enter ranks that are assigned to an FB extent pool. DCA utility queries the state of the system to generate a list of possible parameter values by taking into account the business logic of the architecture to provide only those parameter values that can be specified given the already specified flags (i.e., -stgtype, -extpool) and parameter value(s) (i.e., FB storage type). Thus, in the example shown in FIG. 3D, DCA completion box 312 only lists and displays parameter values P0, P3, and P4. DCA completion box 312 excludes parameter values P1 and P2, which are assigned to the CKD extent pool, but are not specified by the user.

In the examples shown in FIGS. 3A-3D, it should be appreciated that dynamic context assistance may be displayed in a text format in the same screen as CLIs 301, 303, and 305. Alternatively, the dynamic context assistance may be provided in a different screen (which may, for example, correspond to a pop-up GUI display window (not shown)). Accordingly, techniques have been disclosed herein that readily facilitate providing assistance to a user of a system that employs a command line interface.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method of providing assistance to a user of a system that has a command line interface (CLI), comprising:
    receiving at least one current command line interface (CLI) entry, wherein the at least one CLI entry includes one or more command names and one or more command flags; and
    in response to detecting entry of at least one predefined execution key to the system:
        generating a pop-up graphical user interface (GUI) window with one or more parameter values, wherein the number of parameter values presented in the pop-up GUI window changes based on the type of entry provided by the user, wherein a valid parameter value may be selected from a display of the one or more valid parameter values provided within the pop-up GUI window, and wherein only one of the displayed one or more valid parameter values may be selected for execution within the at least one CLI entry;
        displaying the generated dynamic context assistance within the pop-up GUI window; and
        in response to determining a parameter value of the at least one CLI entry is not completed:
            determining a current state of the system, wherein the current state of the system is a configuration based upon one or more entered values and one or more executed values of one or more CLI entries after the at least one predefined execution key entry is received;

identifying, for the at least one CLI entry, one or more valid parameter values to be passed to each of the one or more command flags based on the current state of the system and the one or more command flags of the at least one CLI entry, wherein entry of the one or more valid parameter values in the at least one CLI entry completes the at least one CLI entry;

generating the dynamic context assistance for the command based on the current state of the system, wherein the dynamic context assistance comprises the one or more valid parameter values; and displaying the generated dynamic context assistance comprising the one or more valid parameter values for the command;

wherein the at least one predefined execution key entry indicates a request to initiate a dynamic context assistance wherein the system is storage system.

2. The method of claim 1, further comprising:
displaying the generated dynamic context assistance in at least one of a graphical form and a textual form;
wherein the system is a storage system.

3. The method of claim 1, further comprising:
receiving a selected parameter value responsive to generating the dynamic context assistance; and
appropriately entering the selected parameter value in the CLI.

4. The method of claim 1, in response to a determination that no valid parameter values are available for output, communicating a warning notification.

5. A storage system, comprising:
a display;
a memory; and
a processor coupled to the display, wherein the processor is configured with executable code to:
receive at least one current command line interface (CLI) entry, wherein the at least one CLI entry includes one or more command names and one or more command flags; and
in response to detecting entry of at least one predefined execution key:
generate a pop-up graphical user interface (GUI) window with one or more parameter values, wherein the number of parameter values presented in the pop-up GUI window changes based on the type of entry provided by the user, wherein a valid parameter value may be selected from a display of the one or more valid parameter values provided within the pop-up GUI window, and wherein only one of the displayed one or more valid parameter values may be selected for execution within the at least one CLI entry;
display the generated dynamic context assistance within the pop-up GUI window; and
in response to determining a parameter value of the at least one CLI entry is not completed:
determine a current state of the system, wherein the current state of the system is a configuration based upon one or more entered values and one or more executed values of one or more CLI entries after the at least one predefined execution key entry is received;
identify, for the at least one CLI entry, one or more valid parameter values to be passed to each of the one or more command flags based on the current state of the system and the one or more command flags of the at least one CLI entry, wherein entry of the one or more valid parameter values in the at least one CLI entry completes the at least one CLI entry;
generate the dynamic context assistance for the command based on the current state of the system, wherein the dynamic context assistance comprises the one or more valid parameter values; and
display the generated dynamic context assistance comprising the one or more valid parameter values for the command;
wherein the at least one predefined execution key entry indicates a request to initiate a dynamic context assistance.

6. The storage system of claim 5, wherein the processor is further configured to:
display the generated dynamic context assistance in at least one of a graphical form and a textual form.

7. The storage system of claim 5, wherein the processor is further configured with executable code to:
receive a selected value responsive to generating the dynamic context assistance; and
appropriately enter the selected parameter value in the CLI.

8. The storage system of claim 5, in response to a determination that no valid parameter values are available for output, communicate a warning notification.

9. A computer program product comprising:
a non-transitory computer-usable storage medium for containing and storing program code; and
program code embodied on the non-transitory computer storage medium that when executed by a processor provides the functions of:
receiving at least one current command line interface (CLI) entry, wherein the at least one CLI entry includes one or more command names and one or more command flags; and
in response to detecting entry of at least one predefined execution key to a storage system:
generating a pop-up graphical user interface (GUI) window with one or more parameter values, wherein the number of parameter values presented in the pop-up GUI window changes based on the type of entry provided by the user, wherein a valid parameter value may be selected from a display of the one or more valid parameter values provided within the pop-up GUI window, and wherein only one of the displayed one or more valid parameter values may be selected for execution within the at least one CLI entry; and
displaying the generated dynamic context assistance within the pop-up GUI window; and
in response to determining a parameter value of the at least one CLI entry is not completed:
determining a current state of the system, wherein the current state of the system is a configuration based upon one or more entered values and one or more executed values of one or more CLI entries after the at least one predefined execution key entry is received;
identifying, for the at least one CLI entry, one or more valid parameter values to be passed to each of the one or more command flags based on the current state of the system and the one or more command flags of the at least one CLI entry, wherein entry of the one or more valid parameter values in the at least one CLI entry completes the at least one CLI entry;

generating the dynamic context assistance for the command based on the current state of the system, wherein the dynamic context assistance comprises the one or more valid parameter values; and displaying the generated dynamic context assistance comprising the one or more valid parameter values for the command;

wherein the at least one predefined execution key entry indicates a request to initiate a dynamic context assistance.

10. The computer program product of claim 9, the program code further providing the functions of:

displaying the generated dynamic context assistance in at least one of a graphical form and a textual form; and in response to a determination that no valid parameter values are available for output, communicating a warning notification;

wherein the system is a storage system.

11. The computer program product of claim 9, the program code further providing the functions of:

receiving a selected value responsive to generating the dynamic context assistance; and appropriately entering the selected parameter value in the CLI.

12. The method of claim 1, wherein the at least one predefined execution key entry to the system is a key sequence.

13. The method of claim 1, further comprising:

determining whether each of the one or more command names and the one or more command flags of the at least one CLI entry are completed;

in response to determining each of the one or more command names and the one or more command flags of the at least one CLI entry are not completed, outputting, based on a static list, one or more valid command names corresponding to each of the one or more command names and one or more valid command flags corresponding to each of the one or more command flags; and in response to determining each of the one or more command names and the one or more command flags of the at least one CLI entry are complete, determining whether a parameter value of the at least one CLI entry is completed.

14. The storage system of claim 5, wherein the at least one predefined execution key entry to the system is a key sequence.

15. The storage system of claim 5, wherein the processor is further configured with executable code to:

determine whether each of the one or more command names and the one or more command flags of the at least one CLI entry are completed;

in response to determining each of the one or more command names and the one or more command flags of the at least one CLI entry are not completed, output, based on a static list, one or more valid command names corresponding to each of the one or more command names and one or more valid command flags corresponding to each of the one or more command flags; and in response to determining each of the one or more command names and the one or more command flags of the at least one CLI entry are complete, determine whether a parameter value of the at least one CLI entry is completed.

16. The computer program product of claim 9, wherein the at least one predefined execution key entry to the system is a key sequence.

17. The computer program product of claim 9, the program code further provides the function of:

determining whether each of the one or more command names and the one or more command flags of the at least one CLI entry are completed;

in response to determining each of the one or more command names and the one or more command flags of the at least one CLI entry are not completed, outputting, based on a static list, one or more valid command names corresponding to each of the one or more command names and one or more valid command flags corresponding to each of the one or more command flags; and in response to determining each of the one or more command names and the one or more command flags of the at least one CLI entry are complete, determining whether a parameter value of the at least one CLI entry is completed.

* * * * *